(12) United States Patent
Graham et al.

(10) Patent No.: US 6,968,256 B2
(45) Date of Patent: Nov. 22, 2005

(54) METHOD FOR PROCESSING MANUFACTURED PARTS

(75) Inventors: Michael Evans Graham, Slingerlands, NY (US); Prashant Madhukar Kulkarni, Schenectady, NY (US); John Dennis Jackson, Wyoming, OH (US)

(73) Assignee: General Electric Company, Niskayuna, NY (US)

( * ) Notice: Subject to any disclaimer, the term of this patent is extended or adjusted under 35 U.S.C. 154(b) by 249 days.

(21) Appl. No.: 10/641,789

(22) Filed: Aug. 15, 2003

(65) Prior Publication Data

US 2004/0034444 A1    Feb. 19, 2004

(51) Int. Cl.$^7$ ............................................. G06F 19/00
(52) U.S. Cl. ....................................... 700/186; 700/28
(58) Field of Search ......................... 700/28–31, 159, 700/173–178, 186–194

(56) References Cited

U.S. PATENT DOCUMENTS

| | | | | |
|---|---|---|---|---|
| 4,445,182 A | * | 4/1984 | Morita et al. ................ | 700/183 |
| 4,789,931 A | * | 12/1988 | Kuragano et al. ........... | 700/176 |
| 4,837,703 A | * | 6/1989 | Kakazu et al. .............. | 700/176 |
| 5,555,406 A | * | 9/1996 | Nozawa ......................... | 703/1 |
| 6,107,768 A | * | 8/2000 | Ouchi et al. .............. | 318/568.1 |
| 6,256,546 B1 | | 7/2001 | Graham et al. ................ | 700/30 |
| 6,311,100 B1 | * | 10/2001 | Sarma et al. ................ | 700/190 |
| 6,594,538 B1 | | 7/2003 | Graham et al. .............. | 700/110 |
| 6,661,930 B1 | * | 12/2003 | Graham et al. .............. | 382/276 |
| 6,662,071 B1 | * | 12/2003 | Jackson et al. ............. | 700/159 |
| 6,704,611 B2 | * | 3/2004 | Coleman et al. ............ | 700/186 |
| 6,879,874 B2 | * | 4/2005 | Sinn ........................... | 700/181 |
| 6,907,436 B2 | * | 6/2005 | Ye et al. ..................... | 707/203 |
| 2004/0024472 A1 | * | 2/2004 | Evans et al. ................... | 700/2 |
| 2005/0010555 A1 | * | 1/2005 | Gallivan ........................ | 707/2 |

* cited by examiner

*Primary Examiner*—Maria N. Von Buhr
(74) *Attorney, Agent, or Firm*—Penny A. Clarke; Patrick K. Patnode

(57) ABSTRACT

A method for processing one or more manufactured parts is provided. The method includes generating a number of tool paths corresponding to a feature to be added to the one or more manufactured parts. Each of the tool paths has an effect on a respective one of the representative manufactured parts. The method further includes clustering the tool paths into a number of clusters based on the respective effect and a tolerance of the feature being added to the representative manufactured part and processing a manufactured part using one of the tool paths, which corresponds to a respective subpopulation in which the manufactured part lies.

18 Claims, 12 Drawing Sheets

|  | Taller/Shorter | Left/Right | Wider/Narrower |
|---|---|---|---|
| 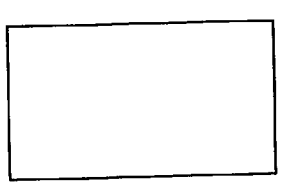 | +2 | 0 | -3 |
| 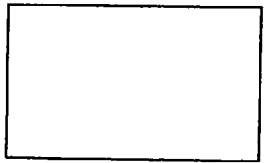 | +1 | +1 | -1 |
| 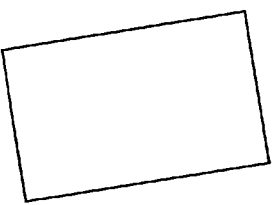 | 0 | -2 | -1 |
| 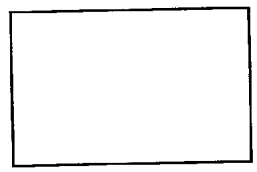 | -2 | 0 | -2 |
FIG. 7

METHOD FOR PROCESSING MANUFACTURED PARTS

BACKGROUND OF THE INVENTION

The invention relates generally to manufacturing parts, and more specifically to a method for processing manufactured parts while reducing dimensional errors.

Typically, while manufacturing multiple instances of the same part, the occurrence of variation in the shapes of the parts is expected. The variation typically occurs within predetermined dimensional limits. The limits to variability are desirable to assure that different mating or interrelated parts fit and function correctly with respect to each other.

Dimensional control is also one important factor in determining the cost of a manufactured part. The cost of a part is driven in large part by the size of the allowable variation of the part shape around the desired nominal shape. As the allowable variation becomes smaller, the part becomes more expensive. Such allowable variation of primary features (bending and twisting, for example) can create situations where the addition of secondary features (those referenced from secondary datums located on the bent or twisted shapes) becomes difficult if those secondary features are machined in the nominal locations.

To address such situations created by normal part shape variation, the practice commonly known has "binning" has been developed. Binning is the division of populations of parts into subpopulations of parts related by their ability to be processed by the same process parameters. Typically parts are divided into bins by weight, thickness, or some other readily quantified dimension. Typically, binning addresses simple dimensional variation, but falls short of being able to effectively process multiple sources of shape variation, for instance thickness and twist at the same time.

It is therefore desirable to develop a technique for processing part populations with several sources of shape variation to allow the largest part shape variation while maintaining fit and function and also controlling the cost.

BRIEF DESCRIPTION OF THE INVENTION

Briefly, in accordance with one embodiment of the present technique, a method for processing one or more manufactured parts is provided. The method includes generating a number of tool paths corresponding to a feature to be added to the one or more manufactured parts. Each of the tool paths corresponds to a respective one of a number of representative manufactured parts. Each of the tool paths has an effect on a respective one of the representative manufactured parts. The method further includes clustering the tool paths into a number of clusters based on the respective effect and a tolerance of the feature being added to the representative manufactured part. A manufactured part is processed using one of the tool paths, which corresponds to a respective subpopulation of parts in which the manufactured part lies.

In a further embodiment a computer-readable medium storing computer instructions for instructing a computer system to process one or more manufactured parts is provided. The computer instructions include characterizing a number of variations. The variations are associated with the representative manufactured parts. The computer instructions further include generating an orthogonal coordinate system using the variations. The orthogonal coordinate system includes a number of coordinates, each of the coordinates contributing a substantial portion of the variation. The computer instructions further include mapping the representative manufactured parts into the orthogonal coordinate system. Each of the manufactured parts is mapped as a respective point in the coordinate system. The computer instructions further include defining a region within the orthogonal coordinate system that encompasses an expected range of variation in the representative manufactured parts. The computer instructions further include populating the region with a number of expected coordinates. The expected coordinates encompass the expected range. The computer instructions also include creating a number of tool paths for each one of the expected coordinates, wherein each tool path has a respective effect on the manufactured part. In addition, the computer instructions include clustering the tool paths into a number of clusters based on the respective effect and a tolerance of the feature being added to the representative manufactured part, and processing a manufactured part using one of the tool paths, which corresponds to a respective sub-population in which the manufactured part lies.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 7 depicts the characterization of each of the rectangles from the sample set by the extent of its deviation from the mean along the principal components of variation;

DETAILED DESCRIPTION OF THE INVENTION

Figure 1:
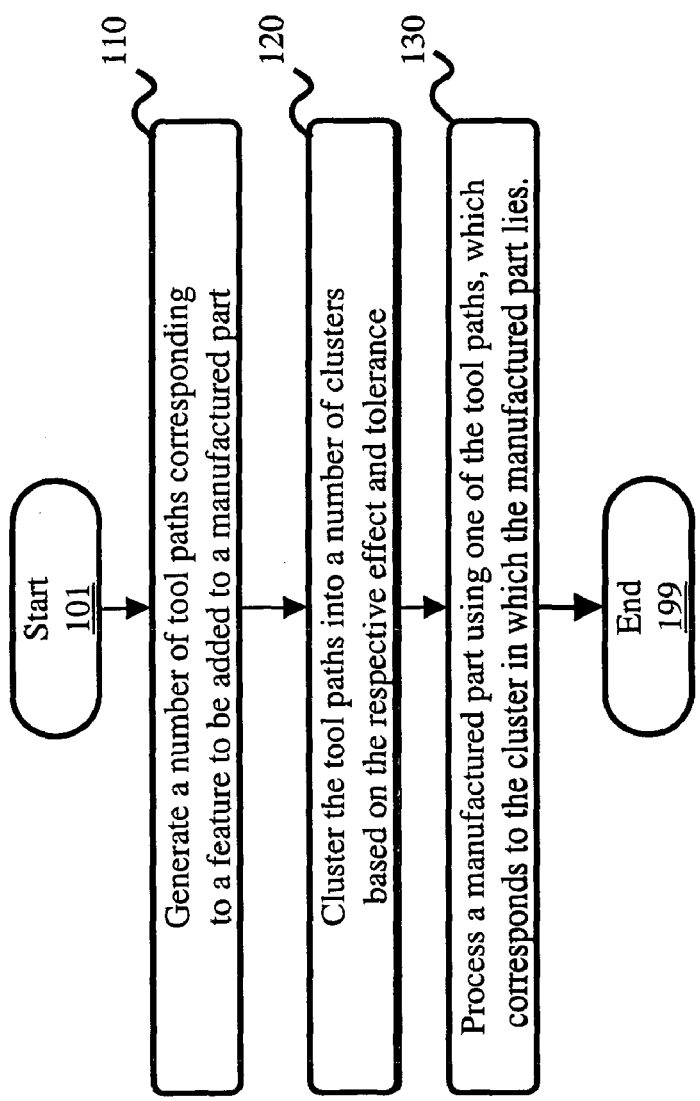
FIG. 1 is a flow chart illustrating one method for processing one or more manufactured parts.

FIG. 1 is a flow chart illustrating one method for processing one or more manufactured parts. The method begins at step 101, and control immediately passes to step 110. Each step is described in further detail below.

Figure 4:
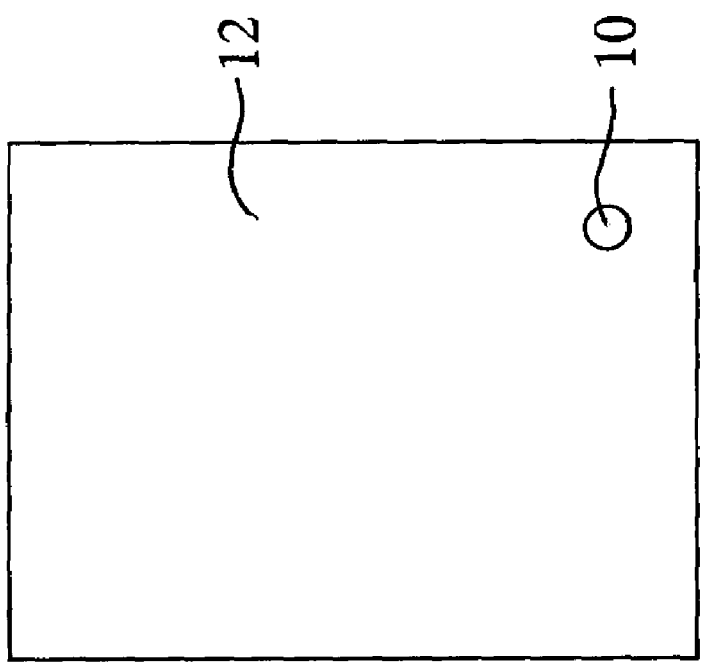
FIG. 4 represents a manufactured part with a feature to be added.

In step 110, a number of tool paths corresponding to a feature 410 to be added to the one or more manufactured parts 412 are generated. A manufactured part 412 is simplistically represented in FIG. 4 as a rectangle. Exemplary manufactured parts 412 include airfoils. An exemplary feature 410 to be added to the part 412 is a hole. Each tool path corresponds to a respective one of a number of representative manufactured parts, and each tool path has a corresponding effect on a respective one of the representative manufactured parts 412.

In step 120, the tool paths are clustered into a number of clusters based on the respective effect and a tolerance of the feature 410 being added to the representative manufactured part 412.

In step 130, a manufactured part 412 is processed using one of the tool paths generated in step 110. The tool path corresponds to a respective subpopulation in which the manufactured part lies. In one embodiment, the manufactured parts are subdivided into subpopulations based on the respective effect and a tolerance of the feature being added to the representative manufactured part. Each subpopulation is processed by a corresponding tool path.

In one embodiment, the above three steps are executed using an orthogonal coordinate system. One method for generating the orthogonal coordinate system and using the orthogonal coordinate system for processing a manufactured part is described in further detail in FIG. 2.

Figure 2:
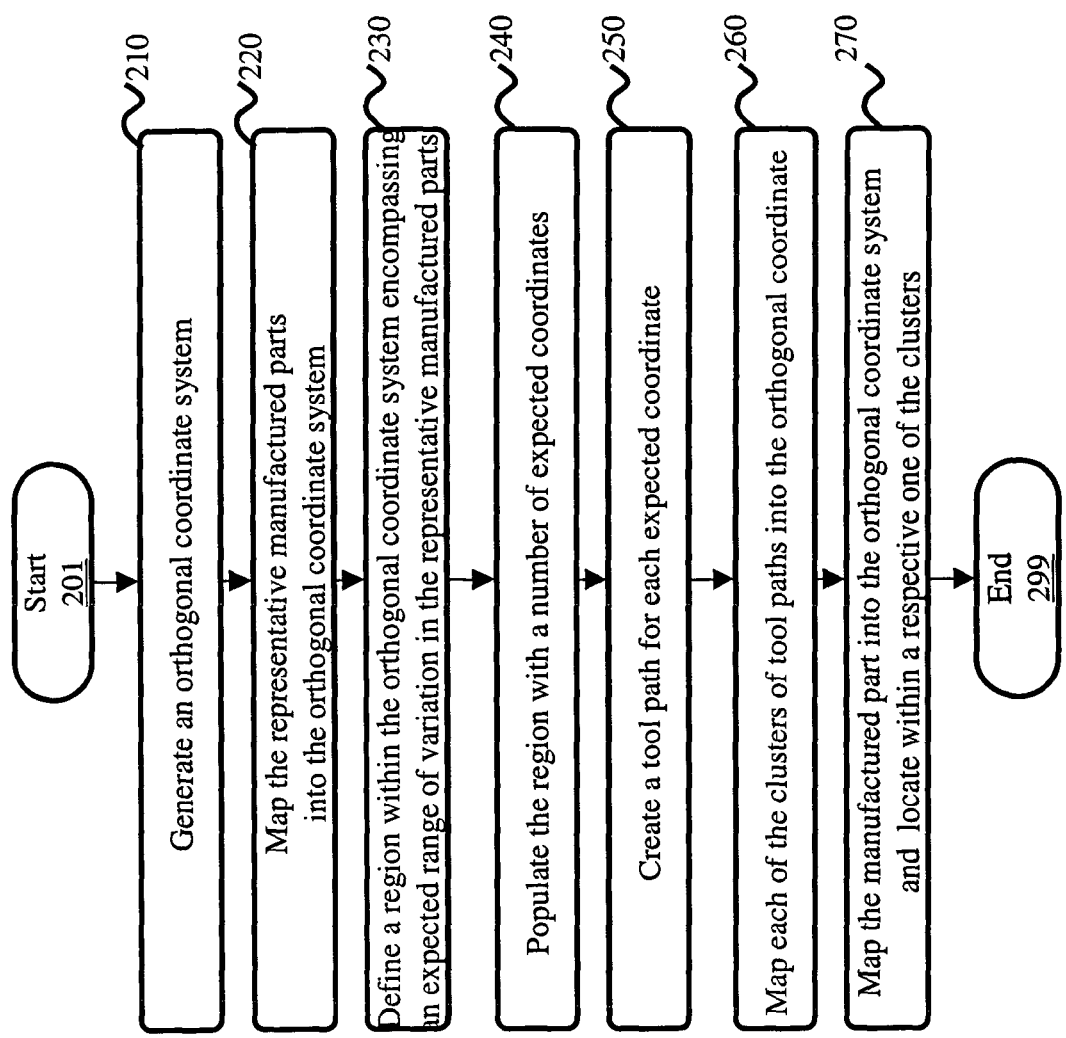
FIG. 2 is a flow chart illustrating one method for using an orthogonal coordinate system for processing one or more manufactured parts.

FIG. 2 is a flow chart illustrating one method for using an orthogonal coordinate system for processing one or more manufactured parts. The method begins at step 201, and control immediately passes to step 210. Each step is described in further detail below.

Figure 5:
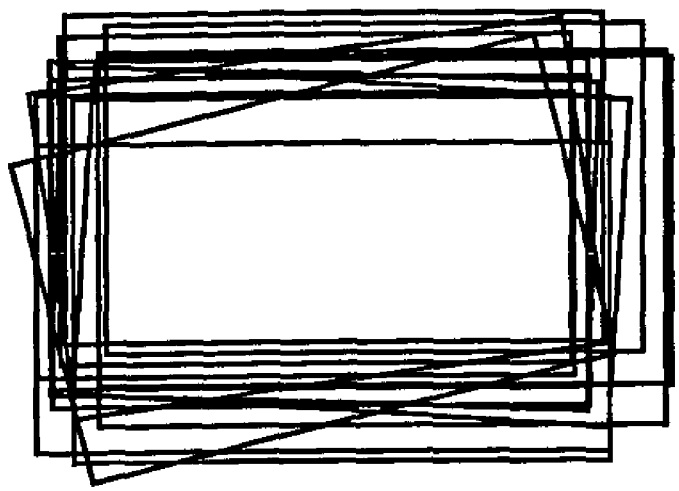
FIG. 5 shows a set of rectangles representing a sample set of manufactured parts containing seemingly random manufacturing variation.

In step 210, an orthogonal coordinate system is generated by characterizing a number of variations. The variations are associated with a corresponding representative manufactured part. For example, shape variation in manufactured parts is a normal occurrence and is illustrated for the simple rectangle example in FIG. 5, which shows a set of rectangles representing a set of manufactured parts containing seemingly random manufacturing variation. In one embodiment, the orthogonal coordinate system comprises a set of coordinates, and each of the coordinates contributes a substantial portion of the variation.

Figure 6:
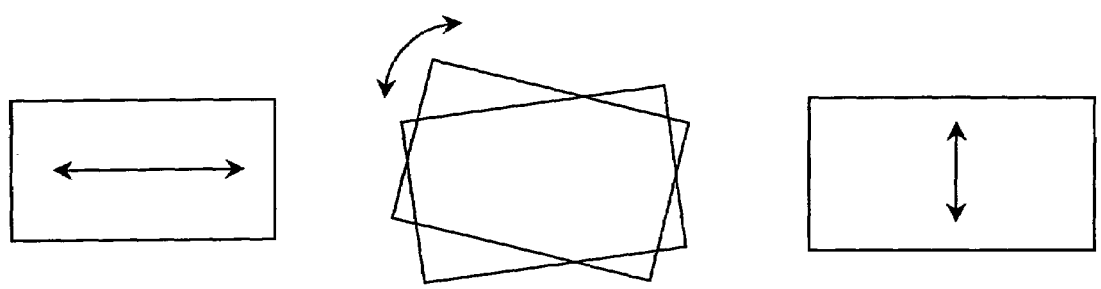
FIG. 6 shows the results of principal component analysis performed on the set of rectangles in FIG. 5.

According to a more particular embodiment, the variation is characterized by computing a number of principal components of variation. For this embodiment, the coordinates are determined using principal component analysis, in order to extract the principal components. More particularly, the components accounting for a significant majority of the variation within the population of manufactured parts are selected. Accordingly, the principal components correspond to the largest Eigenvalues, which reflect the contribution of the components. The significant majority of the variation within the population is selected to satisfy the practicalities of the process at hand. For example, if four principal components of variation of the target population account for 99.5% of the population's variation, practically speaking, they account for a significant majority of the variation within the population. For example, the rectangles of FIG. 5 can be characterized by three major, independent sources of error, as shown in FIG. 6. Each manufactured part can then be represented as a linear combination of the three principal components. More particularly, each manufactured part can be characterized by the extent of its deviation from the mean along the principal components of variation, as shown for the rectangle example in FIG. 7. For this principal component embodiment, the coordinate system is defined by a set of principal components, and each point in the coordinate system represents a unique manufactured part.

In a further embodiment, characterization of the variation includes measuring the representative manufactured parts to determine the variation. For example, a set of points is selected on a part, and the same points are measured for each of the representative manufactured parts making up the sample set. The parts can be measured using any of a number of measurement techniques, including CMM, rulers, and protractors. The measurements can be automated or be performed by hand. More particularly, the sample set of representative manufactured parts is measured, and a number of error measurements are generated for the representative manufactured parts. A number of error techniques may be employed, including point sampling (or local error offsets), thickness error, and degree of twist. The specific error measured will vary with the part type. The principal components of variation can be extracted from the error measurements, as discussed above.

Beneficially, by measuring a sample set of representative manufactured parts and computing their variation from the nominal, error maps can be generated that describe representative part models that span the original distribution of measured parts. The error maps describe independent modes of variation. An error map is a functional or discrete description of errors as they vary across the surface of a part. It includes such methods as discrete errors stored at individual locations, functional maps of error variation across the part surface, and maps of error variation as a function of spatial location. Methods of error mapping are known.

Figure 8:
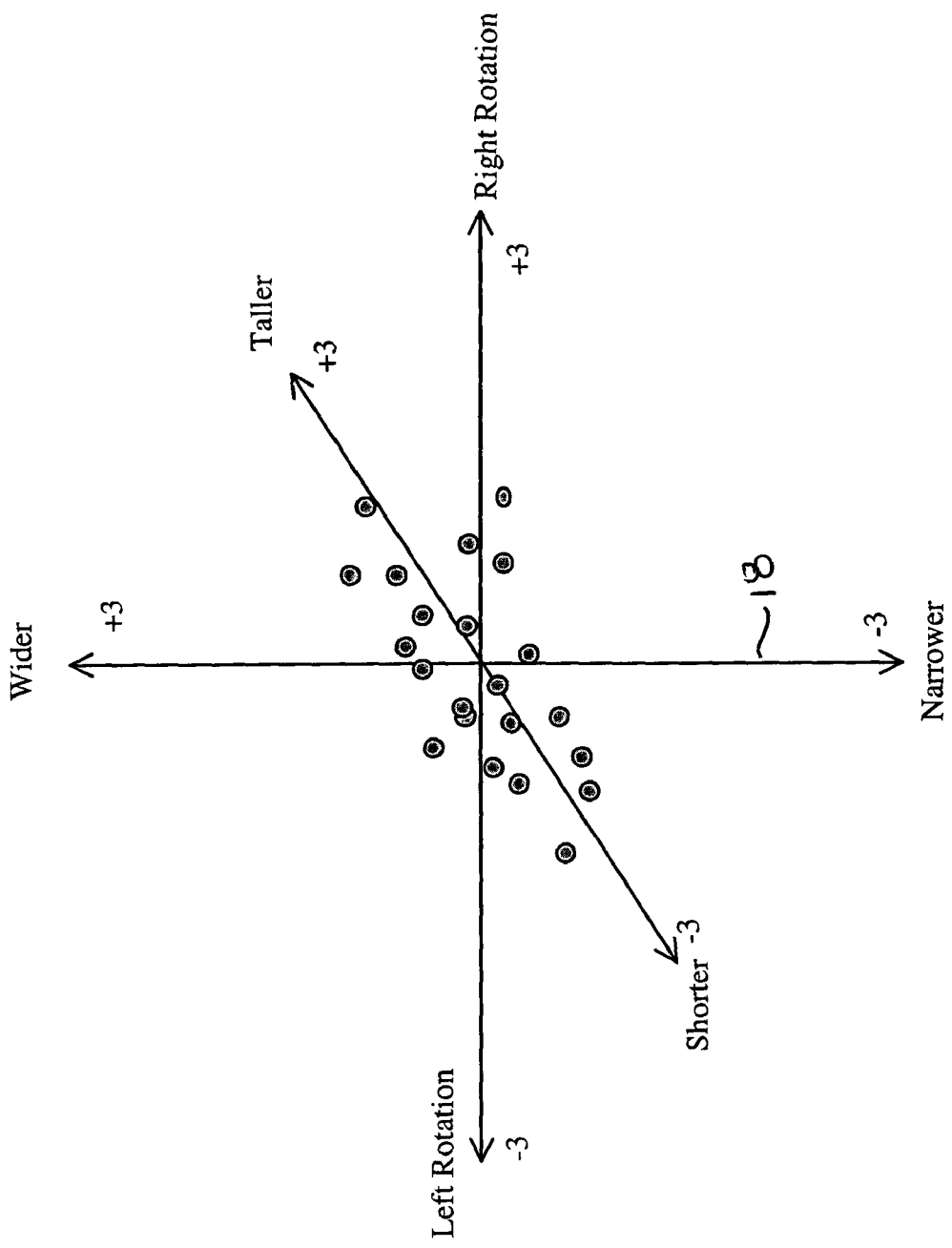
FIG. 8 shows the rectangles from the sample set of FIG. 5 plotted as points in the coordinate system defined by the principal components of the population's variation.

Referring once again to FIG. 2, in step 220, the representative manufactured parts are mapped into the orthogonal coordinate system, and each manufactured part is mapped as a respective point in the coordinate system. For example, the coordinate system is defined by a set of principal components, and each part is mapped as a point in the coordinate system. FIG. 8 shows the rectangles from the sample set plotted as points in the coordinate system defined by the principal components of the population's variation.

Figure 9:
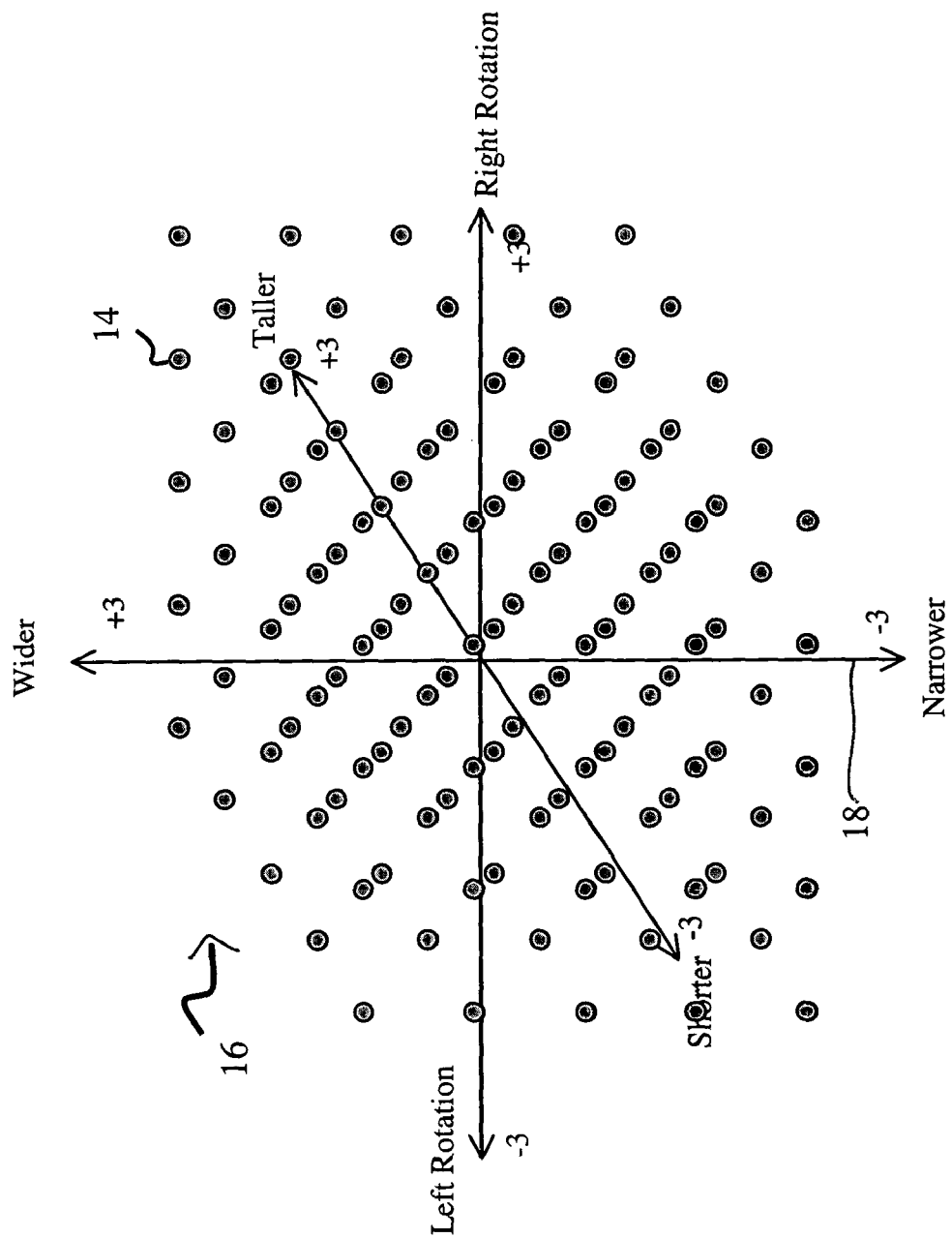
FIG. 9 shows a region encompassing plus/minus three standard deviations from the mean of the population's variation, the region being populated with a set of equally spaced expected coordinates.

Referring to FIG. 2, in step 230, a region is defined within the orthogonal coordinate system that encompasses an expected range of variation in the representative manufactured parts. For example, the region may contain one, two, three, etc., standard deviations from the mean of the population. FIG. 9 shows the coordinate system 418 of FIG. 8 with a defined region 416 of plus/minus three standard deviations from the mean for the population. The extent of the region 416 is determined by practical considerations, based on the process at hand. For many applications, a region of plus/minus three standard deviations from the mean will suffice. In step 240, the region is populated with a number of expected coordinates 414 (or test points), which encompasses the expected range. As shown for example in FIG. 9, a set of equally spaced manufactured parts (the expected coordinates or test points 414) is plotted within the defined region in the coordinate system. As shown in FIG. 9, the test points 414 are located at regular, discrete intervals within the region 416 of the coordinate space.

Figure 10:
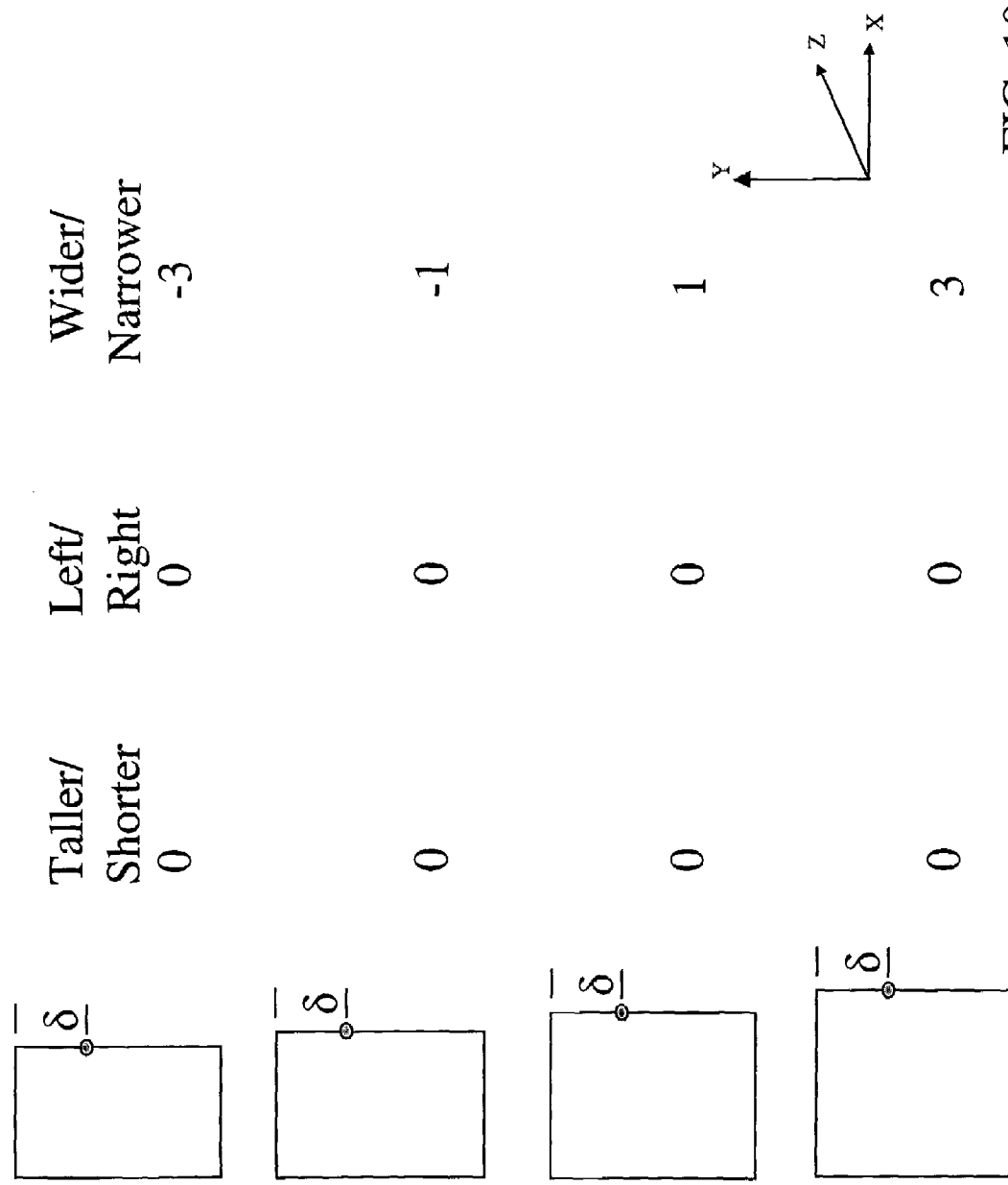
FIG. 10 illustrates different tool paths for forming a feature on four different representative manufactured parts.
Figure 11:
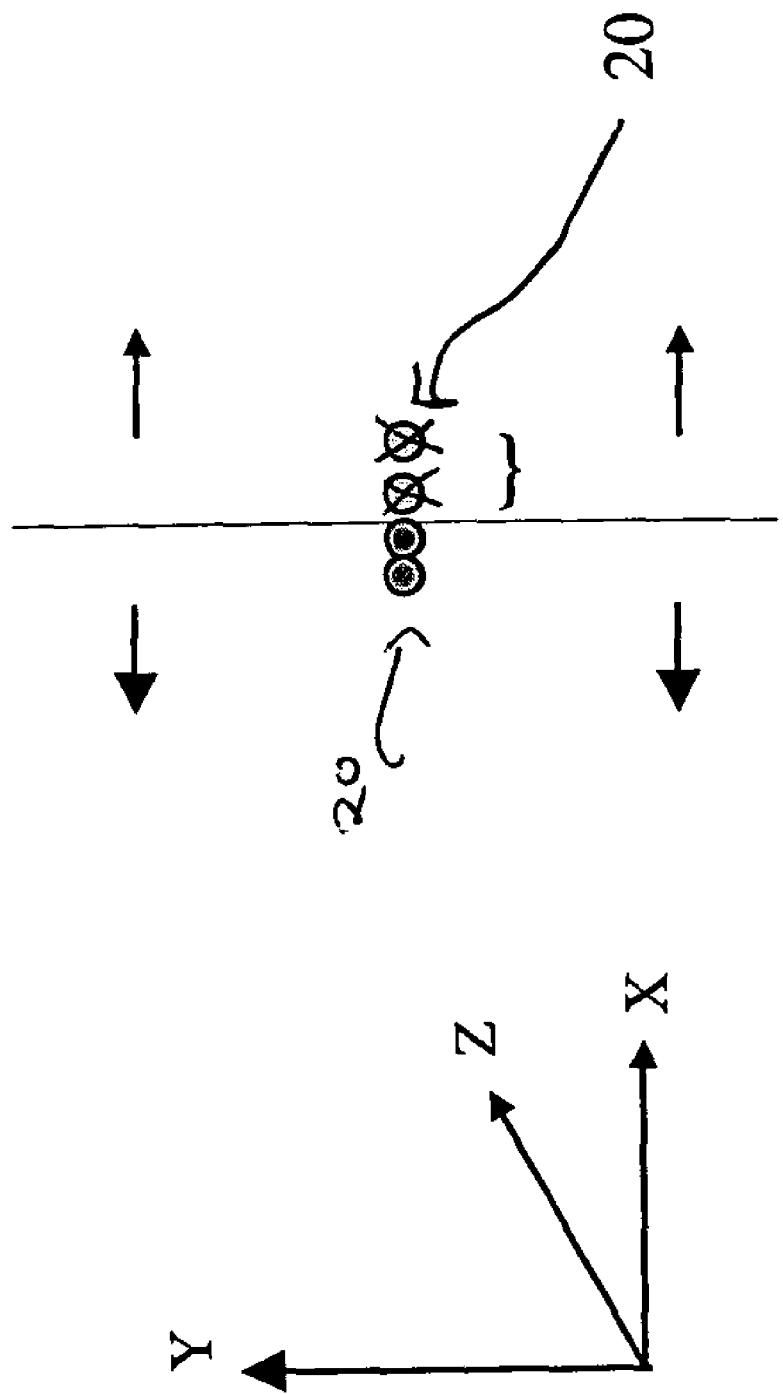
FIG. 11 shows the tool paths partitioned into two clusters.
Figure 12:
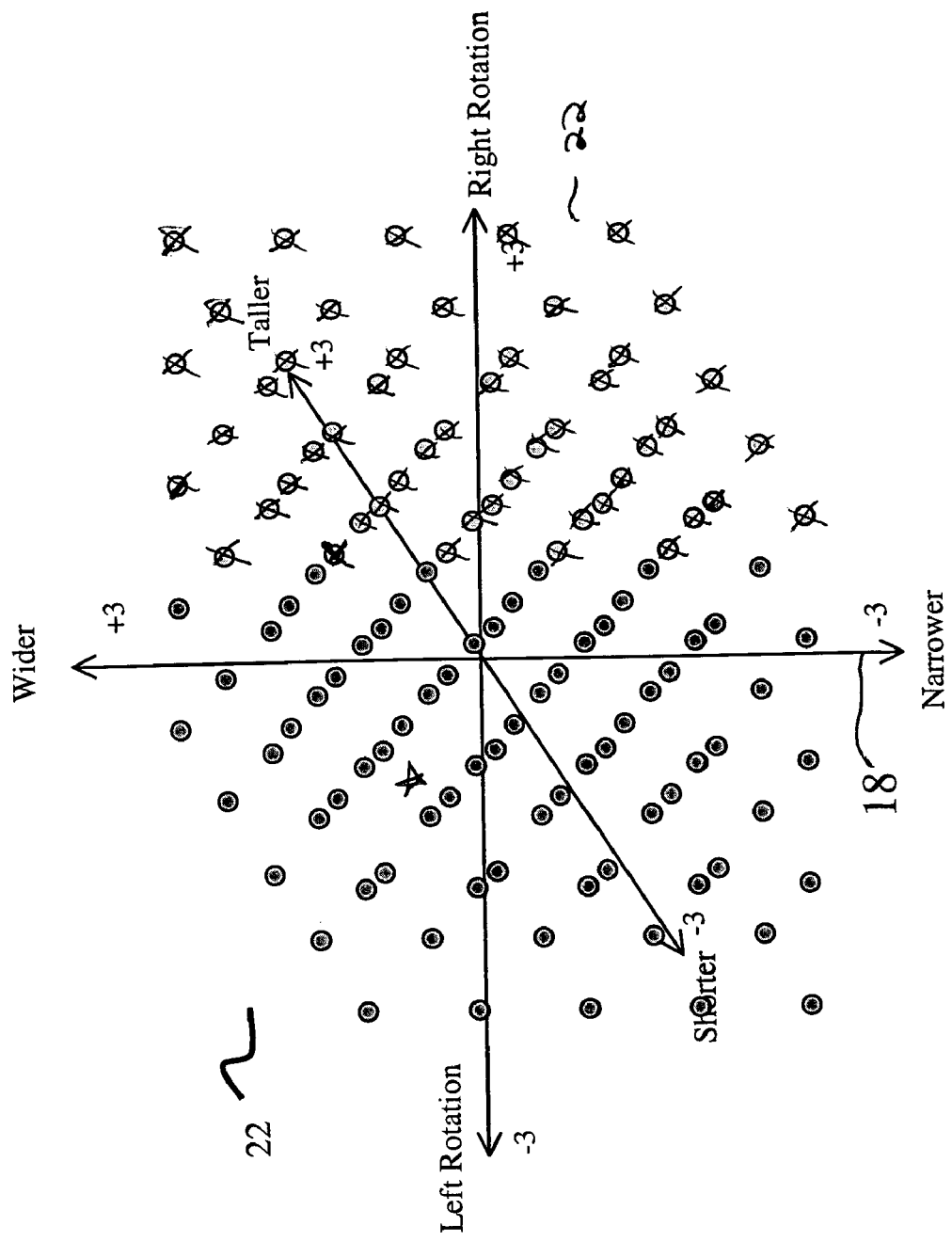
FIG. 12 shows the tool paths mapped onto their respective reference locations in the coordinate system of FIG. 8, with the tool paths being partitioned in the two clusters.

Referring once again to FIG. 2, in step 250, a tool path is created for each expected coordinate 414 (or test point), and each of the tool paths has a respective effect on the manufactured part. Step 250 is illustrated for the simple rectangle example in FIG. 10. Because of the variation in the manufactured parts 412, a different tool path (or reference location on the part 412) must be used for different sized parts 412 to form a feature 410 a distance δ away from an upper edge of the part 412. It is useful to cluster the tool paths, and any of a number of known clustering algorithms may be used to partition the tool paths. The clustering is depicted in FIG. 11, where the tool paths of FIG. 10 (or drilling locations) have been partitioned into two clusters 420. In step 260, each of the clusters 420 of tool paths is mapped into the orthogonal coordinate system to generate a respective cluster 422 of points in the orthogonal coordinate system. FIG. 12 shows the tool paths (or drilling locations) mapped back onto their respective reference locations in the principal component coordinate system. As shown, the tool paths are grouped in two clusters 422, which correspond to the two clusters 420 in FIG. 10.

Beneficially, secondary features, such as holes in a turbine blade, can be accurately machined onto a set of manufactured parts with shapes that vary from the nominal part shape. Referring to FIG. 2, in step 270, a manufactured part 412 is mapped into the orthogonal coordinate system and is located within a respective one of the clusters 422. The manufactured part 412 is represented in FIG. 12 as a star. For example, the measured part 412 is measured to determine its variation from the mean, in order to map the measured part 412 into the orthogonal coordinate system 418. The cluster 422 to which the manufactured part 412 belongs has a corresponding tool path, and the manufactured part is then processed using the tool path corresponding to the cluster in which the manufactured part lies. In this manner, new features can be automatically and accurately positioned relative to existing features on the manufactured part, even when the location of the existing features varies beyond the tolerance limits imposed on the new features being added.

A significant advantage of the inventive method described above is that unique tool paths do not need to be created for each manufactured part in the population. Using the method, only enough tool paths need be generated to process the measured extent of the parts in the population. By using more than one tool path, the variation is reduced of a newly applied numerically controlled (NC) feature against those local secondary datums, from which the new NC feature is defined. Because this method is suitable for automation, it can reduce manual labor and the variation caused by manual processes.

Figure 3:
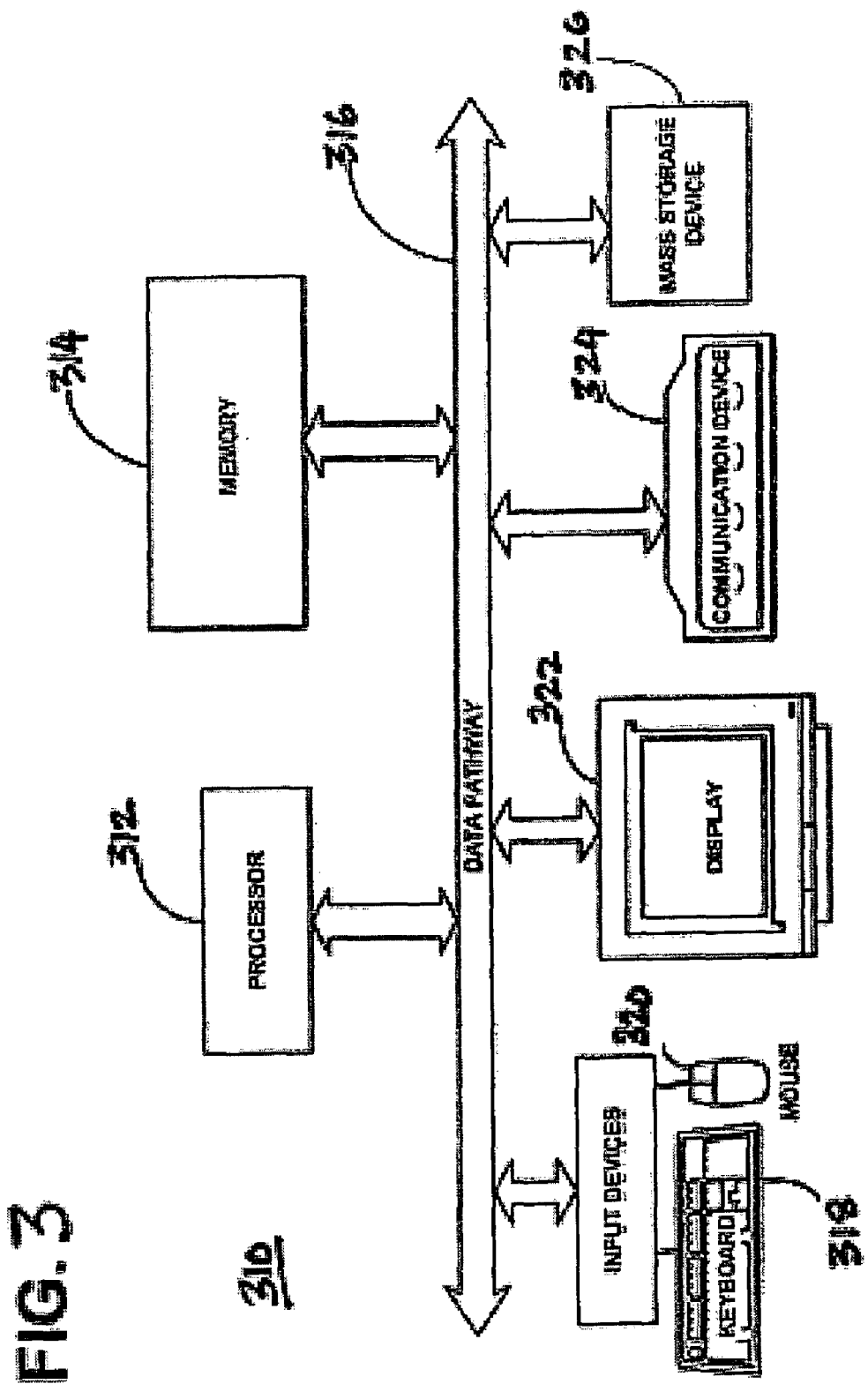
FIG. 3 is a block diagram of one embodiment of a general purpose computer system.

FIG. 3 shows a schematic of a general-purpose computer system 310 that controls the processing of a manufactured part. The computer system 310 generally comprises at least one processor 312, a memory 314, input/output devices, and data pathways (e.g., buses) 16 connecting the processor, memory and input/output devices. The processor 312 accepts instructions and data from the memory 14 and performs various calculations. The processor 312 includes an arithmetic logic unit (ALU) that performs arithmetic and logical operations and a control unit that extracts instructions from memory 314 and decodes and executes them, calling on the ALU when necessary. The memory 314 generally includes a random-access memory (RAM) and a read-only memory (ROM), however, there may be other types of memory such as programmable read-only memory (PROM), erasable programmable read-only memory (EPROM) and electrically erasable programmable read-only memory (EEPROM). Also, the memory 314 preferably contains an operating system, which executes on the processor 312. The operating system performs basic tasks that include recognizing input, sending output to output devices, keeping track of files and directories and controlling various peripheral devices.

The input/output devices may comprise a keyboard 318 and a mouse 320 that enter data and instructions into the computer system 310. Also, a display 322 may be used to allow a user to see what the computer has accomplished. Other output devices may include a printer, plotter, synthesizer and speakers. A communication device 324 such as a telephone or cable modem or a network card such as an Ethernet adapter, local area network (LAN) adapter, integrated services digital network (ISDN) adapter, or Digital Subscriber Line (DSL) adapter, that enables the computer system 310 to access other computers and resources on a network such as a LAN or a wide area network (WAN). A mass storage device 326 may be used to allow the computer system 310 to permanently retain large amounts of data. The mass storage device may include all types of disk drives such as floppy disks, hard disks and optical disks, as well as tape drives that can read and write data onto a tape that could include digital audio tapes (DAT), digital linear tapes (DLT), or other magnetically coded media. The above-described computer system 310 can take the form of a hand-held digital computer, personal digital assistant computer, notebook computer, personal computer, workstation, mini-computer, mainframe computer or supercomputer.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for processing one or more manufactured parts, said method comprising:
generating a plurality of tool paths corresponding to a feature to be added to the one or more manufactured parts, wherein each of the tool paths corresponds to a respective one of a plurality of representative manufactured parts, and wherein each of the tool paths has an effect on a respective one of the representative manufactured parts;
clustering the tool paths into a plurality of clusters based on the respective effect and a tolerance of the feature being added to the representative manufactured part; and
processing a manufactured part using one of the tool paths, which corresponds to a respective subpopulation in which the manufactured part lies.

2. The method of claim 1, further comprising dividing the manufactured parts into a plurality of subpopulations based on the respective effect and the tolerance of the feature being added to the representative manufactured part, and wherein each of the manufactured parts in a respective one of the subpopulations is processed by a corresponding tool path.

3. The method of claim 1, further comprising:
generating an orthogonal coordinate system;
mapping the plurality of representative manufactured parts into the orthogonal coordinate system, wherein each of the manufactured part is mapped as a respective point in the orthogonal coordinate system;
defining a region within the orthogonal coordinate system that encompasses an expected range of variation in the representative manufactured parts;
populating the region with a plurality of expected coordinates, wherein the expected coordinates encompasses the expected range of variation in the representative manufactured parts; and
creating a respective tool path for each of the expected coordinates in the region.

4. The method of claim 3, further comprising characterizing a variation associated with the representative manufactured parts,
wherein the orthogonal coordinate system is generated using the variation, and wherein the orthogonal coordinate system comprises a plurality of coordinates, each of the coordinates contributing to a substantial portion of the variation.

5. The method of claim 4, wherein the characterizing the variation comprises using a plurality of principal components of variation.

6. The method of claim 5, further comprising:
measuring the representative manufactured parts to generate a plurality of error measurements; and
extracting the principal components of variation from the error measurements.

7. The method of claim 3, wherein the clustering comprises mapping each of the clusters of tool paths into the orthogonal coordinate system to generate a respective cluster of points in the orthogonal coordinate system.

8. The method of claim 7, wherein the processing step comprises mapping the manufactured part into the orthogonal coordinate system and locating the manufactured part within a respective one of the clusters.

9. A computer-readable medium storing computer instructions for instructing a computer system to process one or more manufactured parts, the computer instructions comprising:
generating a plurality of tool paths corresponding to a feature to be added to the one or more manufactured parts, wherein each of the tool paths corresponds to a respective one of a plurality of representative manufactured parts, and wherein each of the tool paths has an effect on a respective one of the representative manufactured parts;
clustering the tool paths into a plurality of clusters based on the respective effect and a tolerance of the feature being added to the representative manufactured part; and
processing a manufactured part using one of the tool paths, which corresponds to a respective subpopulation in which the manufactured part lies.

10. The computer readable medium of claim 9, the computer instructions further comprising dividing the manufactured parts into a plurality of subpopulations based on the respective effect and the tolerance of the feature being added to the representative manufactured part, and wherein each of the manufactured parts in a respective one of the subpopulations is processed by a corresponding tool path.

11. The computer readable medium of claim 9, the computer instructions further comprising:
generating an orthogonal coordinate system;
mapping the plurality of representative manufactured parts into the orthogonal coordinate system, wherein each of the manufactured part is mapped as a respective point in the coordinate system;
defining a region within the orthogonal coordinate system that encompasses an expected range of variation in the representative manufactured parts;
populating the region with a plurality of expected coordinates, wherein the plurality of expected coordinates encompasses the expected range; and
creating the tool path for each expected coordinate, wherein each of the tool paths has a respective effect on the manufactured part.

12. The computer readable medium of claim 11, the computer instructions further comprising:
characterizing a variation associated with the representative manufactured parts using a plurality of principal components of variation;
measuring the representative manufactured parts to generate a plurality of error measurements; and
extracting the principal components of variation from the error measurements,
wherein the orthogonal coordinate system comprises a plurality of coordinates, each of the coordinates contributing a substantial portion of the variation.

13. The computer readable medium of claim 11, wherein the clustering comprises mapping each of the clusters of tool paths into the orthogonal coordinate system to generate a respective cluster of points in the orthogonal coordinate system.

14. The computer readable medium of claim 13, wherein the processing step comprises mapping the manufactured part into the orthogonal coordinate system and locating the manufactured part within a respective one of the clusters.

15. A method for processing one or more manufactured parts, said method comprising;
characterizing a variation of a plurality of representative manufactured parts;
generating an orthogonal coordinate system using the variation, wherein the orthogonal coordinate system comprises a plurality of coordinates, each of the coordinates contributing a substantial portion of the variation;
mapping the representative manufactured parts into the orthogonal coordinate system, wherein each of the manufactured parts is mapped as a respective point in the coordinate system;
defining a region within the orthogonal coordinate system that encompasses an expected range of variation in the representative manufactured parts;
populating the region with a plurality of expected coordinates, wherein the plurality of expected coordinates encompasses the expected range;
creating a tool path for each of the expected coordinates, wherein each tool path has a respective effect on the manufactured part;
clustering the tool paths into a plurality of clusters based on the respective effect and a tolerance of the feature being added to a manufactured part; and
processing the manufactured part using one of the tool paths, which corresponds to a respective subpopulation in which the manufactured part lies.

16. The method of claim 15, wherein the characterizing the variation comprises using a plurality of principal components of variation.

17. The method of claim 16, wherein the characterizing the variation comprises measuring the set of representative parts to generate a plurality of error measurements for the representative manufactured parts, and extracting the principal components of variation from the error measurements.

18. The method of claim 15, further comprising dividing the manufactured parts into a plurality of subpopulations based on the respective effect and the tolerance of the feature being added to the representative manufactured part, and wherein each of the manufactured parts in a respective one of the subpopulations is processed by a corresponding tool path.

* * * * *